(12) United States Patent
Bae et al.

(10) Patent No.: US 7,069,374 B2
(45) Date of Patent: Jun. 27, 2006

(54) OPTICAL DISC DRIVE HAVING A CONTROL BOARD AND DRIVING UNIT IN SEPARATE LOCATIONS

(75) Inventors: Byoung-young Bae, Suwon-si (KR); Soon-kyo Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 10/743,327

(22) Filed: Dec. 23, 2003

(65) Prior Publication Data

US 2004/0181624 A1    Sep. 16, 2004

(30) Foreign Application Priority Data

Dec. 27, 2002    (KR)    ............... 10-2002-0085444

(51) Int. Cl.
*G06F 13/00*    (2006.01)
*G11B 33/12*    (2006.01)
*G06F 12/00*    (2006.01)
*G06F 17/00*    (2006.01)

(52) U.S. Cl. ............... 710/313; 710/100; 710/301; 720/652

(58) Field of Classification Search ............... 710/100, 710/300, 301, 313, 315, 1; 235/454; 369/18, 369/24.01, 30.03, 47.1, 44.31; 711/111, 711/112; 720/652, 653
See application file for complete search history.

(56) References Cited

U.S. PATENT DOCUMENTS

| | | | | |
|---|---|---|---|---|
| 5,025,339 A | * | 6/1991 | Kanno et al. | 360/99.06 |
| 5,121,483 A | * | 6/1992 | Monahan et al. | 710/40 |
| 5,511,055 A | * | 4/1996 | Otsuki et al. | 720/649 |
| 5,596,562 A | * | 1/1997 | Chen | 710/315 |
| 5,881,309 A | * | 3/1999 | Ohashi et al. | 710/2 |
| 6,070,226 A | * | 5/2000 | Freeman et al. | 711/117 |
| 6,137,767 A | * | 10/2000 | Ro et al. | 369/275.3 |
| 6,295,569 B1 | * | 9/2001 | Shimura et al. | 710/305 |
| 6,400,566 B1 | * | 6/2002 | Ootori | 361/695 |
| 6,502,755 B1 | * | 1/2003 | Liu et al. | 235/489 |
| 6,542,917 B1 | * | 4/2003 | Watanabe et al. | 708/605 |
| 6,744,445 B1 | * | 6/2004 | Goto et al. | 715/719 |
| 6,874,003 B1 | * | 3/2005 | Morohashi | 707/204 |
| 6,910,218 B1 | * | 6/2005 | Park et al. | 720/653 |
| 6,928,595 B1 | * | 8/2005 | Takahashi et al. | 714/718 |
| 2001/0009564 A1 | * | 7/2001 | Goto et al. | 375/211 |
| 2003/0179667 A1 | * | 9/2003 | Yoshinaka et al. | 369/44.41 |
| 2004/0190416 A1 | * | 9/2004 | Kakiuchi | 369/53.11 |

FOREIGN PATENT DOCUMENTS

JP    8-161862    6/1996
KR    2002-0027732    4/2002

OTHER PUBLICATIONS

"A micro optical flying head for a PCMCIA-sized optical data storage" by Kim et al. (abstract only) Publication Date: 2004.*

Korean Patent Office Action for related application 10-2002-0085444, with translation.

* cited by examiner

*Primary Examiner*—Gopal C. Ray
(74) *Attorney, Agent, or Firm*—Staas & Halsey LLP

(57) ABSTRACT

An optical disc drive that includes a driving unit including a spindle motor to rotate an optical disc, an optical pickup to access the optical disc, and a connection board connected to a computer. A control board to control the driving unit, is installed at an interface device of the computer, separate from the driving unit, and is connected to the connection board.

18 Claims, 3 Drawing Sheets

OPTICAL DISC DRIVE HAVING A CONTROL BOARD AND DRIVING UNIT IN SEPARATE LOCATIONS

CROSS-REFERENCE TO RELATED APPLICATIONS

This application claims the priority of Korean Patent Application No. 2002-85444, filed on Dec. 27, 2002, in the Korean Intellectual Property Office, the disclosure of which is incorporated herein in its entirety by reference.

BACKGROUND OF THE INVENTION

1. Field of the Invention

The present invention relates to an optical disc drive, and more particularly, to an optical disc drive which can be connected to a computer.

2. Description of the Related Art

In general, optical disc drives record information on a recording surface of an optical disc, such as a CD or a DVD, or read information from the recording surface. The information is recorded or read by emitting a beam of light from an optical pickup sliding across the optical disc onto the recording surface of the optical disc that is rotating. In particular, slim optical disc drives are manufactured to be very thin so that they can be used in portable computers such as notebook computers.

FIG. 1 is a plan view illustrating a conventional slim optical disc drive. Referring to FIG. 1, a tray 20 is slidably installed in a lower case 10. A spindle motor 30 to rotate an optical disc D and an optical pickup 50 to read or write information by accessing the optical disc D while sliding across the optical disc D that is rotating are installed on the tray 20. A main control board 60 to control the operation of the optical disc drive is installed in the lower case 10 and connected to the optical pickup 50 and the spindle motor 30 installed on the tray 20 by an FPC (flexible printed circuit) 70. The FPC 70 is flexibly folded or unfolded in a space between the tray 20 and the lower case 10 as the tray 20 slides. A connecter 80 is provided on the main control board 60 for connection to a portable computer.

Some of the factors that affect the thickness of the slim optical disc drive, include the thickness of driving parts such as the optical pickup 50 mounted on the tray 20 and the thickness of the main control board 60 to control the driving parts 40. In particular, since the main control board 60 is installed between the tray 20 and the lower case 10, if the thicknesses of electric/electronic parts mounted on the upper and lower surfaces of the main control board 60 increase, the thickness of the slim optical disc drive increases accordingly.

Furthermore, slim optical disc drives have recently added the recording/reproducing functions of a CD-R, a CD-RW and/or a DVD reproduction function, in addition to a CD-ROM reproduction function. In this case, to accommodate the above various functions, the optical pickup 50 is made thick and large. Also, since electric parts having various thicknesses are installed on the main control board 60, the thickness of the slim optical disc drive increases.

SUMMARY OF THE INVENTION

To solve the above and/or other problems, the present invention provides an optical disc drive having a control board and a driving unit in separate locations in a portable computer.

According to an aspect of the present invention, an optical disc drive comprises a driving unit including a spindle motor to rotate an optical disc, an optical pickup to access the optical disc, and a connection board connected to a computer, and a control board to control the driving unit, which is installed at an interface device of the computer, separate from the driving unit, and connected to the connection board.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
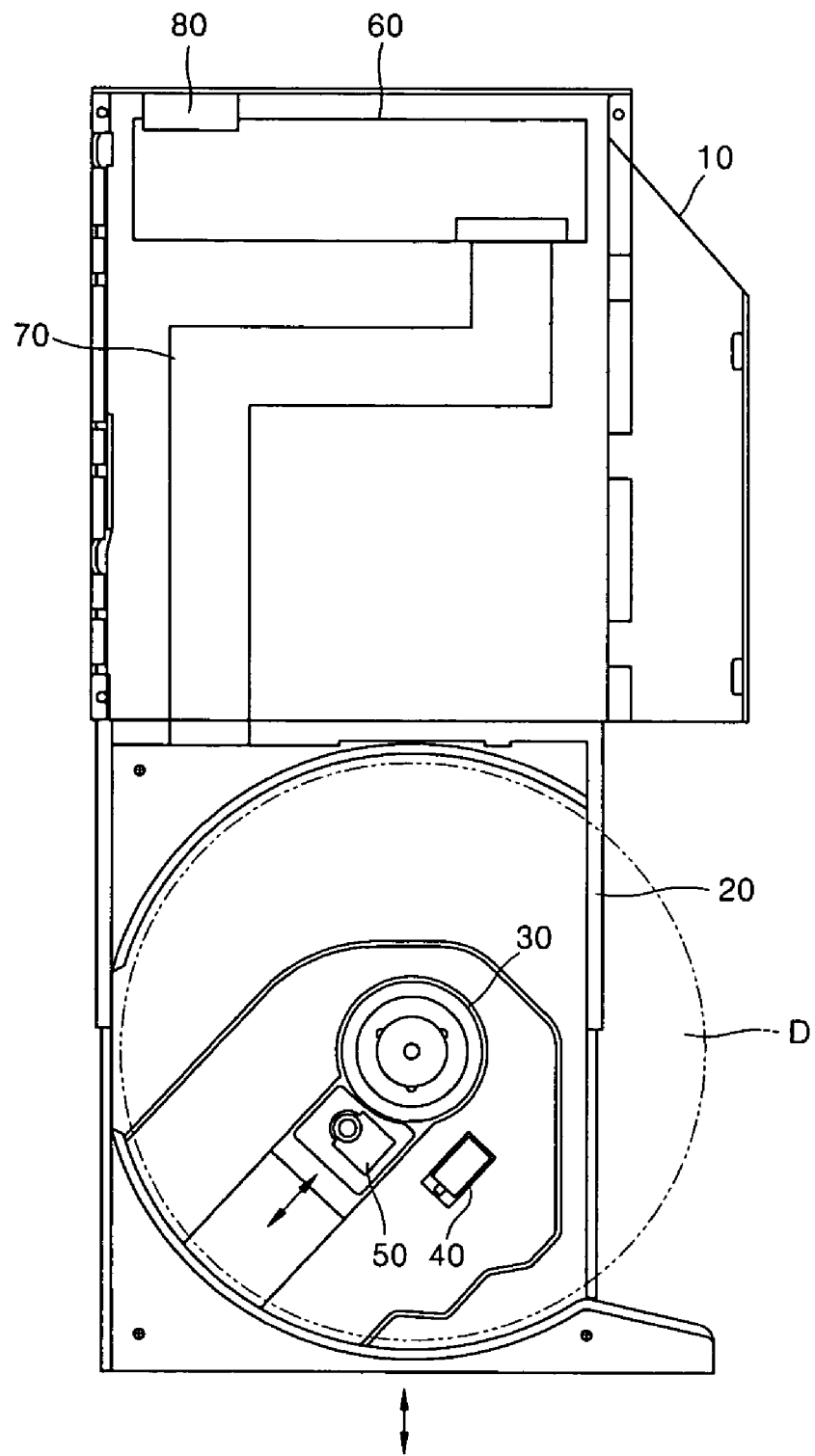
FIG. 1 is a plan view illustrating a conventional slim optical disc drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
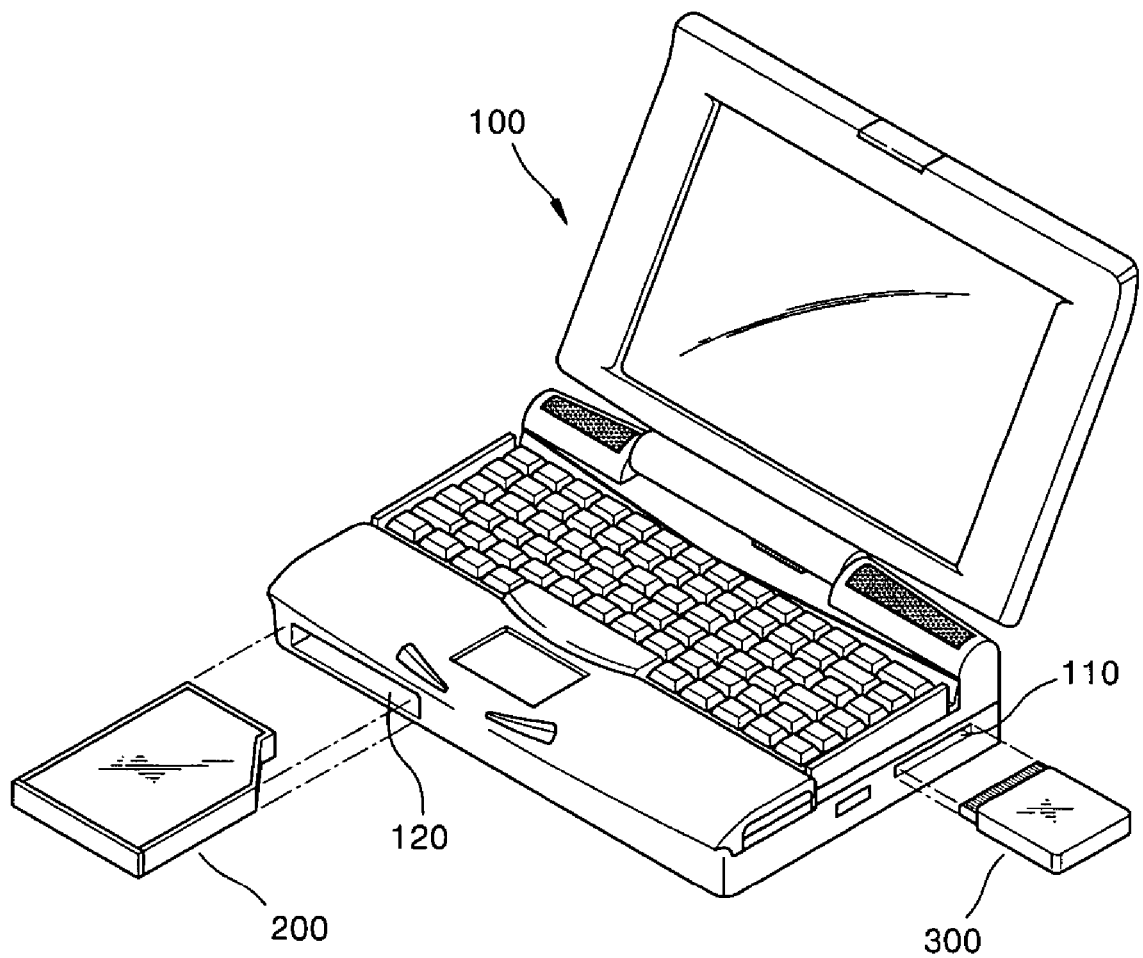
FIG. 2 is a perspective view illustrating an optical disc drive according to an embodiment of the present invention.

FIG. 2 shows an optical disc drive according to an embodiment of the present invention. Referring to FIG. 2, a portable computer 100 includes an installation portion 120 where a slim optical disc drive is installed and at least one PCMCIA (personal computer memory card international association) slot 110 where a PCMCIA card may be installed. The optical disc drive according to this embodiment of the present invention includes a driving unit 200 manufactured to be slim so as to be installed in the installation portion 120 and a separate control board 300 installed in the PCMCIA slot 110 to control the driving unit 200.

Figure 3:
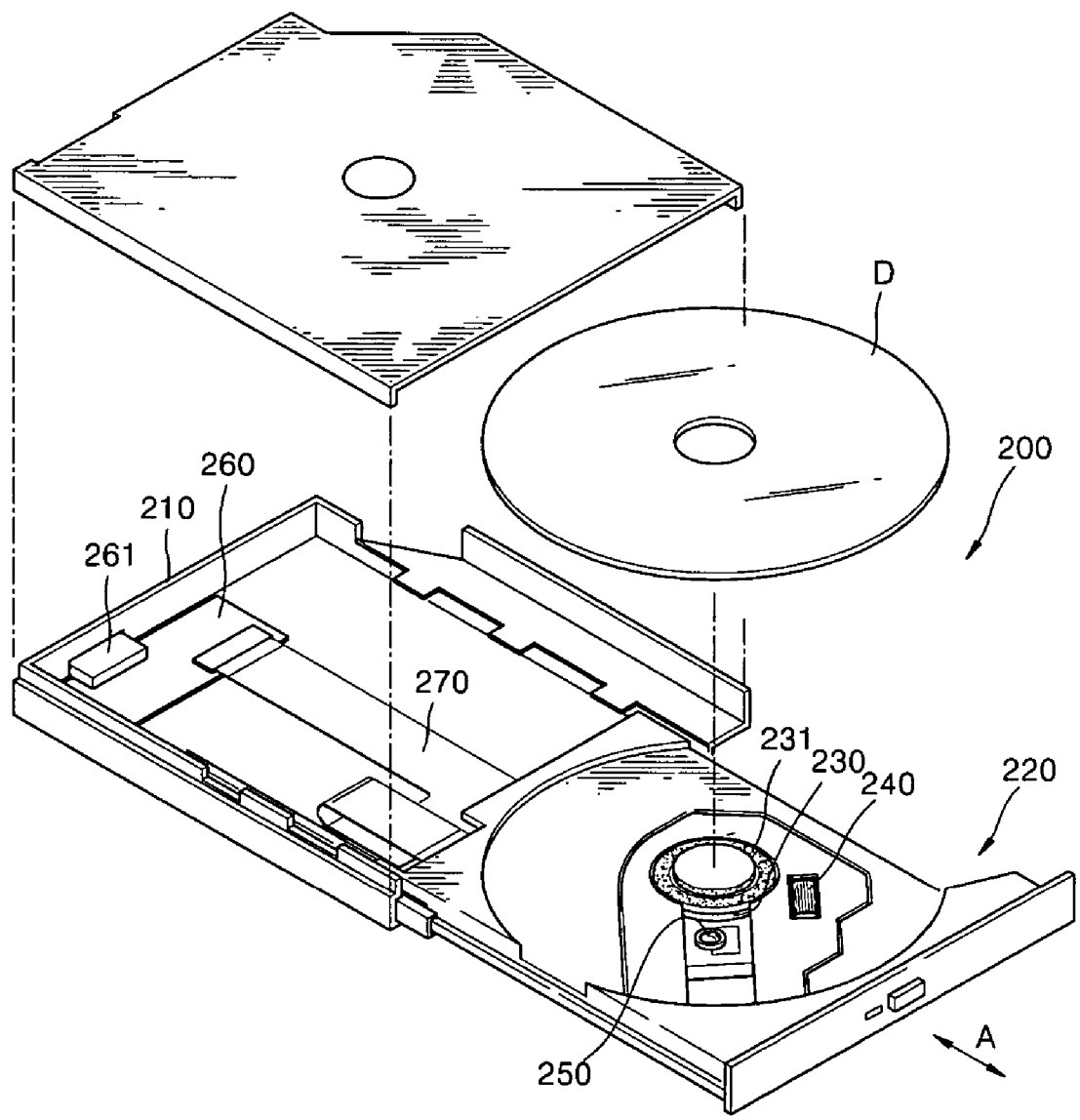
FIG. 3 is an exploded perspective view illustrating a driving unit shown in FIG. 2.

FIG. 3 shows a driving unit according to an embodiment of the present invention. Referring to FIG. 3 the driving unit 200 includes a spindle motor 230 and an optical pickup 250 and the outer dimensions of the driving unit 200 are manufactured to specifications so as to be installed in a portable computer. The spindle motor 230 and the optical pickup 250 are installed on a tray 220 that is installed to slide in a direction A in a lower case 210. A driving motor 240 to slide the optical pickup 250 in a radial direction of an optical disc D is installed on the tray 220. The spindle motor 230 rotates the optical disc D and a turntable 231 is installed on a rotation shaft of the spindle motor 230. The optical disc D is accommodated on the turntable 231. The optical pickup 250 is driven by the driving motor 240 to slide in the radial direction of the optical disc D while accessing a recording surface of the optical disc D to record or reproduce information.

The driving unit 200 further includes a connection board 260 which is connected through an FPC (flexible printed circuit) 270 to control elements provided in the driving unit 200, such as the spindle motor 230, the optical pickup 250, and the driving motor 240. A connector 261 connected to the portable computer 100 is provided at the connection board 260. The driving unit 200 is electrically connected to the control board 300 and the portable computer 100 through the connection board 260. Because the connection board 260 functions to connect the control board 300 and the portable computer 100, it can be made smaller than the conventional control board 60 of FIG. 1 that must provide circuitry for numerous control functions.

The control board 300 to control the driving unit 200 is installed on an interface device such as a USB port and a PCMCIA slot of the portable computer 100, not in the driving unit 200. In this embodiment, the control board 300 is manufactured into a PCMCIA card type so as to be installed in the PCMCIA slot. However, it is understood that the other implementations of the control board using standardized interfaces such as USB, USB 2.0, or IEEE 1394 may be used in place of the PCMCIA configuration.

The PCMCIA card is standardized by the Personal Computer Memory Card International Association that is a computer manufacturer's association that sets standards for adaptor cards having a credit card size used in notebook computers. There are three types of PCMCIA cards: Type I having a thickness of 3.3 mm is mainly used for a RAM or ROM extension card; Type II having a thickness of 5.5 mm is mainly used for a modem; and Type III having a maximum thickness of 10.5 mm is used for a small hard disk.

The control board 300 may be manufactured in one of the three types according to how much the thickness can be reduced while including a function to control the driving unit 200. When installed in the PCMCIA slot 110 of the portable computer 100, the control board 300 is connected to the driving unit 200 and controls the operation of the driving unit 200.

When the driving unit 200 and the control board 300 are installed in the installation portion 120 and the PCMCIA slot 110, respectively, the driving unit 200 and the control board 300 are connected to each other through control buses and data buses provided in the portable computer 100. The driving unit 200 and the control board 300 may be connected to each other by an additional connector such as a cable (not shown).

When the control board 300 is installed in the PCMCIA slot 110, a CPU (not shown) of the portable computer 100 recognizes the control board 300 as an optical disk drive. When a write/read signal is input from the CPU, the control board 300 drives the driving unit 200 to record information on the optical disc D or read the information from the optical disc D.

When the control board 300 is manufactured separately from the driving unit 200, as mentioned above, it is desirable to make the driving unit 200 as thin as possible. Because the connection board 260 installed on the driving unit 200 needs to serve as a connection mechanism of the driving unit 200, the control board 300, and the portable computer 100, the size of the driving unit 200 may be kept thin. Thus, the size and thickness of the driving unit 200 are decreased compared to those of the conventional control board 60 of FIG. 1.

Current slim optical disc drives often have a recording/reproducing function of a CD-R, CD-RW and a reproduction function of a DVD-ROM, in addition to a reproduction function of a CD-ROM. The slim optical disc drive according to the present invention can accommodate the increased functionality without increasing in size because, the control board is installed in the PCMCIA slot and is separated from the driving unit and the connection board having only the minimum function to connect the driving unit and the control board is provided in the driving unit.

Also, in the conventional slim optical disc drive, even if the thickness of a product can be reduced due to the decreased size and thickness of the spindle motor, the optical pickup, and the driving motor, the entire thickness of the product cannot be reduced when the thickness of the control board is not reduced. However, in the slim optical disc drive according to the present invention, since the control board is separated from the driving unit, the thickness of the driving unit can be directly reduced in the above case. Thus, the slim optical disc drive according to the present invention can correspond to the trend of manufacturing a slim portable computer.

Furthermore, since there are three types of PCMCIA slots, the thickness of the control board can be 10.5 mm at its maximum. Moreover, the control board can be installed in the PCMCIA slot and does not need to be entirely inserted in the slot, that is, part of the control board may protrude out of the PCMCIA slot. Thus, when the slim optical disc drive becomes multifunctional, there is no limit in the size of the control board to accommodate the functions.

In this embodiment, the driving unit is designed as a built-in type installed in a portable computer. However, the optical disc drive according to the present invention is not limited to this design. Although not shown in the drawings, the driving unit may be an external type connected to the control board by an additional connector (not shown) such as a connection cable, instead of being installed in the portable computer. In this case, the size and thickness of the driving unit does not affect the portable computer at all.

The optical disc drive according to the present invention can be used not only for portable computers, but also desktop computers having an interface device such as a USB port and a PCMCIA slot.

As described above, according to the optical disc drive according to the present invention, because the control board and the driving unit are separated, the slim optical disc drive can be realized so that the trend of making portable computers thinner can be satisfied. Also, the optical disc drive can be used not only for portable computers but also desktop computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc drive for an optical disc comprising:
   a driving unit including a spindle motor to rotate the optical disc, an optical pickup to access the optical disc, and a connection board connected to a computer; and
   a control board to control the driving unit, which is installed at an interface device of the computer, separate from the driving unit, and connected to the connection board.

2. The optical disc drive as claimed in claim 1, wherein the interface device is a PCMCIA slot.

3. The optical disc drive as in claim 1, wherein the interface device is a USB port.

4. An optical disc drive system for an optical disc comprising:
   a driving unit having a spindle motor to rotate the optical disc, an optical pickup to read/write to the optical disc, a drive motor to move the optical pickup across a surface of the optical disc, and a connector to connect to a computer; and a controller to control the driving unit having an interface to connect to the computer, wherein the controller is located remotely from the driving unit.

5. The system as in claim 4, wherein the driving unit is an external device that connects to the computer by a cable.

6. The system as in claim 4, wherein the driving unit is an internal device that fits into a peripheral slot of the computer.

7. The system as in claim 4, wherein the controller is connected to the driving unit by a cable.

8. The system as in claim 4, wherein the controller is an external device that connects to the computer by a cable connected to an interface port.

9. The system as in claim 4, wherein the controller is connected to the driving unit by a bus in the computer.

10. The system as in claim 4, wherein the controller interface is a PCMCIA interface.

11. The system as in claim 4, wherein the controller interface is a USB interface.

12. An optical disc drive system for an optical disc comprising:

a driving unit having a spindle motor to rotate the optical disc, an optical pickup to read/write to the optical disc, a drive motor to move the optical pickup across a surface of the optical disc, and a connector, wherein the driving unit fits in a peripheral slot of a computer; and a controller to control the driving unit having an interface to connect to the computer, wherein the controller is located remotely from the driving unit.

13. The system as in claim 12, wherein the controller connects to the computer via a standardized interface slot.

14. The system as in claim 13, wherein the connector of the driving unit does not perform control functions.

15. The system as in claim 13, wherein the controller can increase in size without affecting the size of the driving unit.

16. The system as in claim 13, wherein the thickness of the driving unit is controlled by the spindle motor, the optical pickup and the driving motor, wherein reductions in size of the spindle motor, the optical pickup and the driving motor allow the driving unit size to be reduced.

17. The system as in claim 13, wherein the controller is connected to the computer via a PCMCIA slot.

18. The system as in claim 17, wherein a portion of the controller is inserted into the PCMCIA slot and a portion of the controller is outside the slot, wherein the portion of the controller that is outside the slot may be sized to accommodate circuitry to control the driving unit.

* * * * *